May 13, 1924.

E. M. FRASER

POWER TRANSMISSION AND CONTROL

Filed Oct. 30, 1920

Inventor
Ethelbert M. Fraser
By his Attorneys
Kiddle & Margreon

May 13, 1924.
E. M. FRASER
1,493,853
POWER TRANSMISSION AND CONTROL
Filed Oct. 30, 1920 6 Sheets-Sheet 2
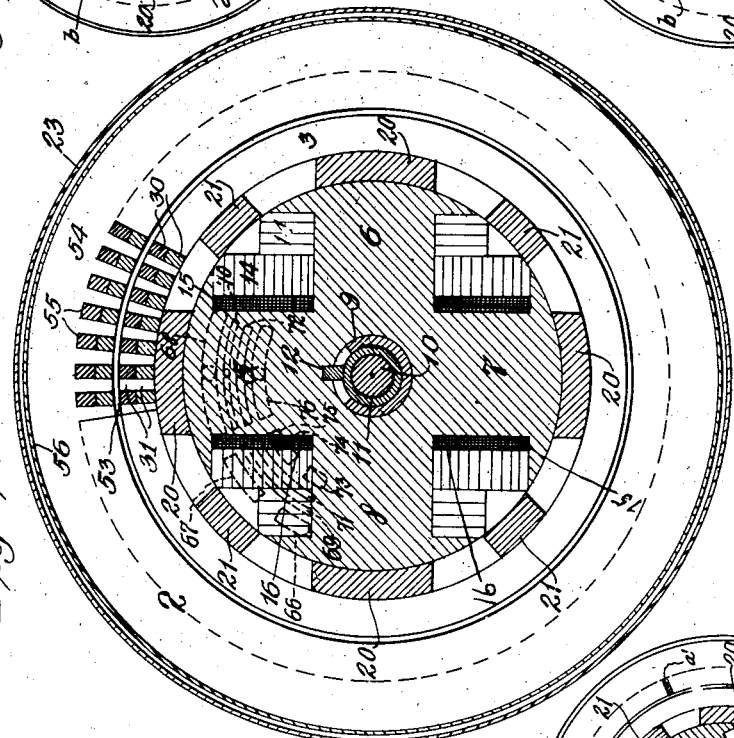

May 13, 1924.
E. M. FRASER
1,493,853
POWER TRANSMISSION AND CONTROL
Filed Oct. 30, 1920
6 Sheets-Sheet 3
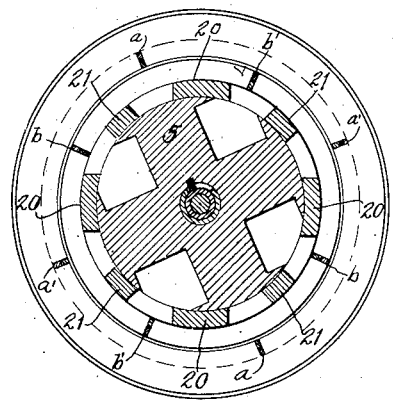
Fig. 7
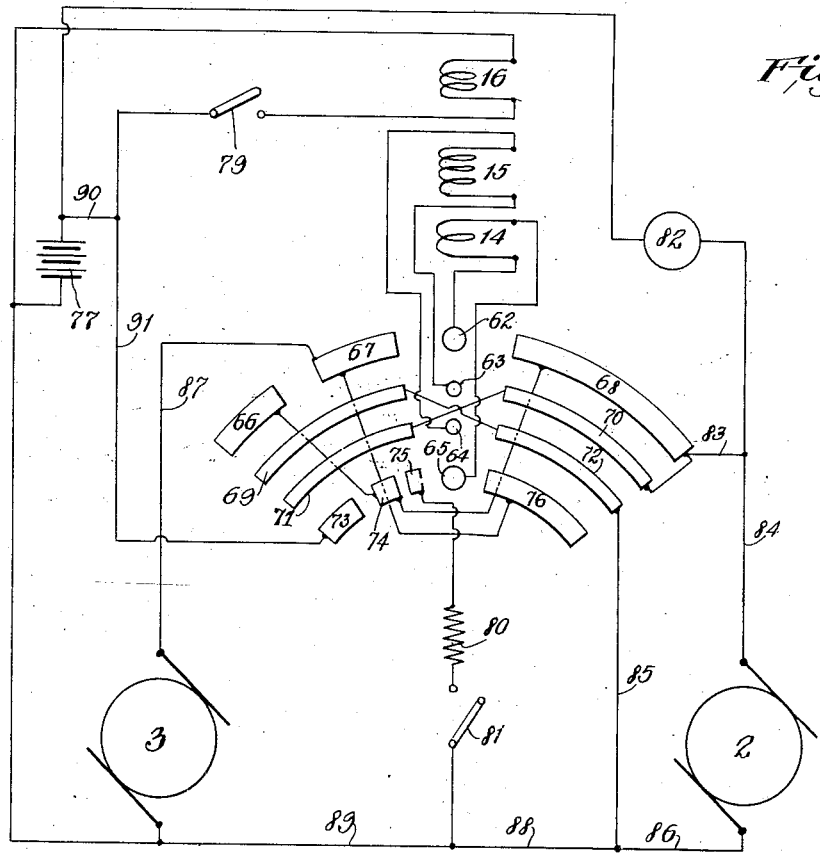
Fig. 8,
Inventor
Ethelbert M. Fraser
By his Attorneys
Kiddle & Margeson May 13, 1924.

E. M. FRASER 1,493,853

POWER TRANSMISSION AND CONTROL

Filed Oct. 30, 1920

Inventor
Ethelbert M. Fraser
By his Attorneys
Kiddle & Margeson

May 13, 1924.

E. M. FRASER

POWER TRANSMISSION AND CONTROL

Filed Oct. 30, 1920

Inventor
Ethelbert M. Fraser
By his Attorneys
Kiddle & Margrave

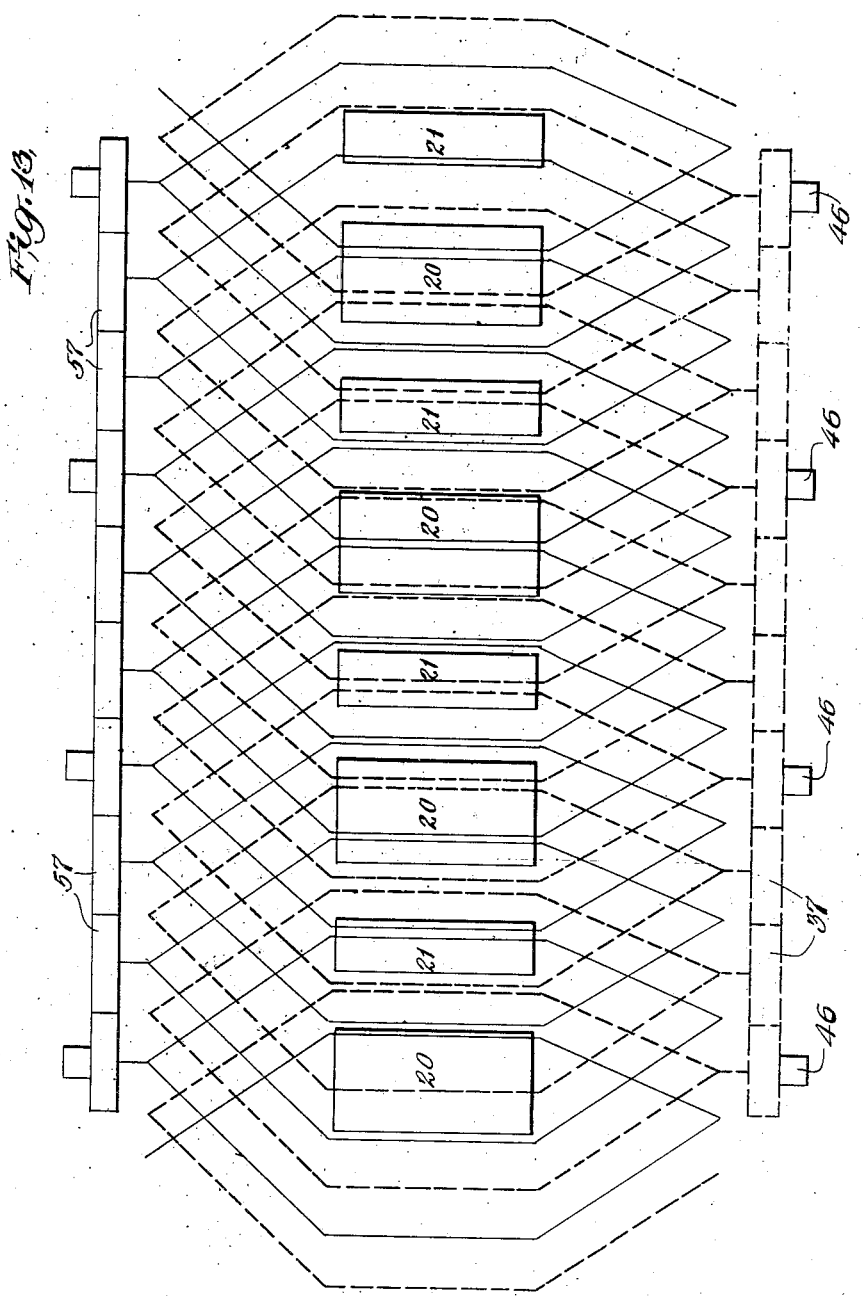

Patented May 13, 1924.

1,493,853

UNITED STATES PATENT OFFICE.

ETHELBERT M. FRASER, OF YONKERS, NEW YORK, ASSIGNOR TO THE FRASER PATENTS COMPANY, A CORPORATION OF DELAWARE.

POWER TRANSMISSION AND CONTROL.

Application filed October 30, 1920. Serial No. 420,681.

*To all whom it may concern:*

Be it known that I, ETHELBERT M. FRASER, a citizen of the Dominion of Canada, residing at Yonkers, county of Westchester, and State of New York, have invented new and useful Improvements in Power Transmissions and Controls, of which the following is a specification.

My invention relates to an electric power transmission whereby mechanical power is transformed into electric power and electric power is transformed back into mechanical power, and to the method of controlling said transmission of power, the apparatus being so constructed and arranged that the speed and torque of the prime mover or power-supplying means can be varied through wide limits when transmitted through the apparatus to the driven part.

As shown and described herein, my improved power transmission comprises a magnetic flux-producing field structure, flux-diverting means, an armature that normally functions as a generator armature, and an independently rotatable second winding that normally functions as a motor armature winding. While the apparatus is particularly adapted as a transmission in an automobile intermediate the engine (prime mover) and the propeller shaft (driven part), it is of course apparent that it may be utilized between any prime mover or power-supplying means and a driven part. Many instances in which my transmission apparatus is adapted to be used may be cited but the adaptation of the same will be apparent to those skilled in the art.

In the embodiment of my improved power transmission herein shown and described, the field structure which is angularly adjustable or rotatable within certain limits is the inner member, the generator armature which is rotatable is the outer member, the second winding is independently rotatable and intermediate the field structure and the generator armature, while the flux-diverting means or pole-pieces are stationary and intermediate the field structure and second winding. It is to be understood, however, that the relative positions of the parts so far referred to are illustrative and not definitive.

Some of the objects of my invention are to provide an electric power transmission whereby (1) the relative speed of the two armatures can be changed without varying the field excitation; (2) the effective flux supplied to the armatures can be varied without varying the field excitation; (3) infinitesimal variations in the relative speeds of the two armatures can be secured by moving the field cores; (4) commutating pole effects can be obtained by utilizing the flux from the field cores; (5) reversal of the direction of the rotation of either armature can be secured by movement of the field cores; (6) variation in the effective field flux is secured without the utilization of resistance in the field circuit; and (7) the making or breaking of any contact carrying full load current is avoided.

Other objects of my invention will appear from the drawings and the detailed description to follow.

One embodiment of my invention is illustrated in the accompanying drawings, forming part of the specification, in which—

Fig. 2 is a cross section of the power transmission apparatus taken on the line XX of Fig. 1, and illustrates the position of the field cores with respect to the stationary pole-pieces during the normal operation of the device at engine speed;

Figs. 3, 4, 5, 6 and 7 are diagrammatic views in reduced cross-section to illustrate the position of the field cores with respect to the stationary pole-pieces at various stages of operation of the power transmission;

Fig. 3 illustrates the position of the field cores when the device is started; Fig. 4 when the device is in neutral; Fig. 5 when the device is operating at high speed; Fig. 6 when the device is in reverse; and Fig. 7 when the device is operating as an electromagnetic brake.

Fig. 8 is a wiring diagram illustrating the electrical connections when the device is in neutral, or non-operating position.

Figure 9:
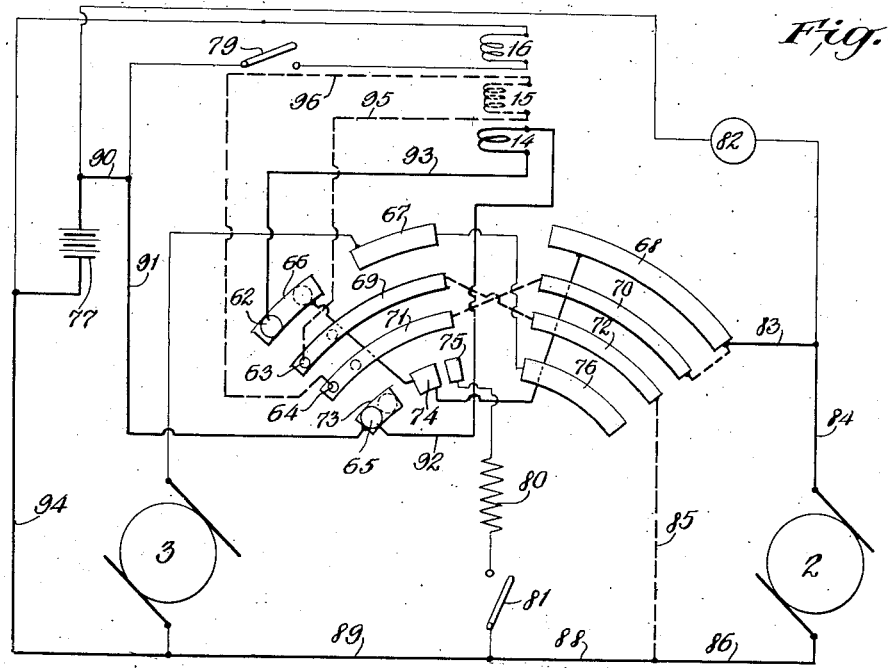

Fig. 9 is a wiring diagram illustrating the electrical connections when the device is started.

Figure 10:
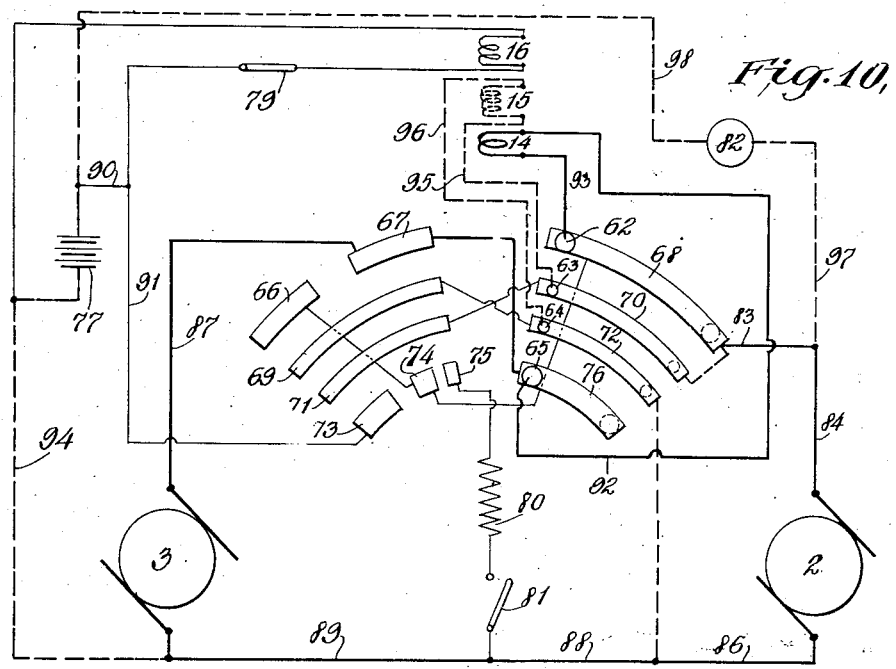
Figure 11:
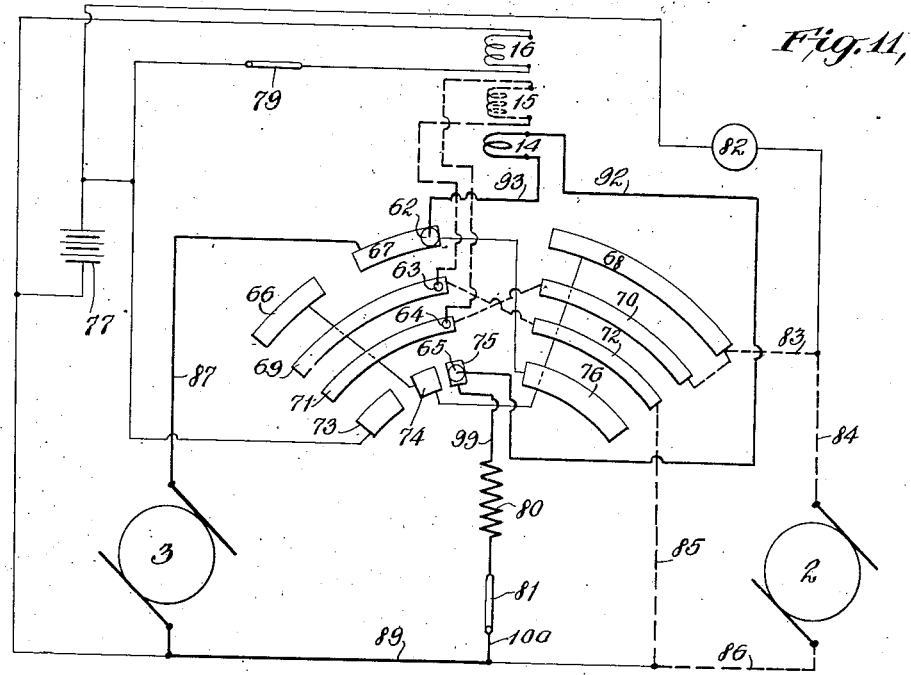

Fig. 10 is a wiring diagram illustrating the electrical connections during the normal operation of the device at high speed and also during the charging of the battery, Fig. 11 is a wiring diagram illustrating the electrical connections when the device is operated as an electro-magnetic brake.

Figure 12:
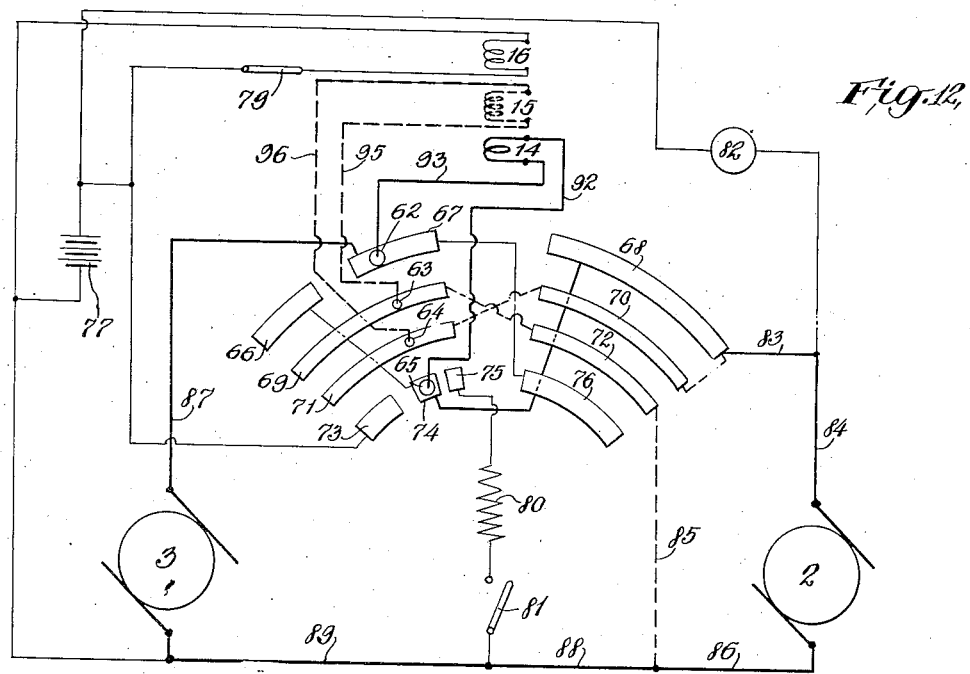

Fig. 12 is a wiring diagram illustrating the electrical connections when the device is operated to drive the driven part in a direction reverse to that during the normal operation of the device; and Fig. 13 illustrates the arrangement of the auxiliary pole pieces and the development of the generator and motor armature windings in relation to their respective commutators and said pole pieces.

Figure 1:
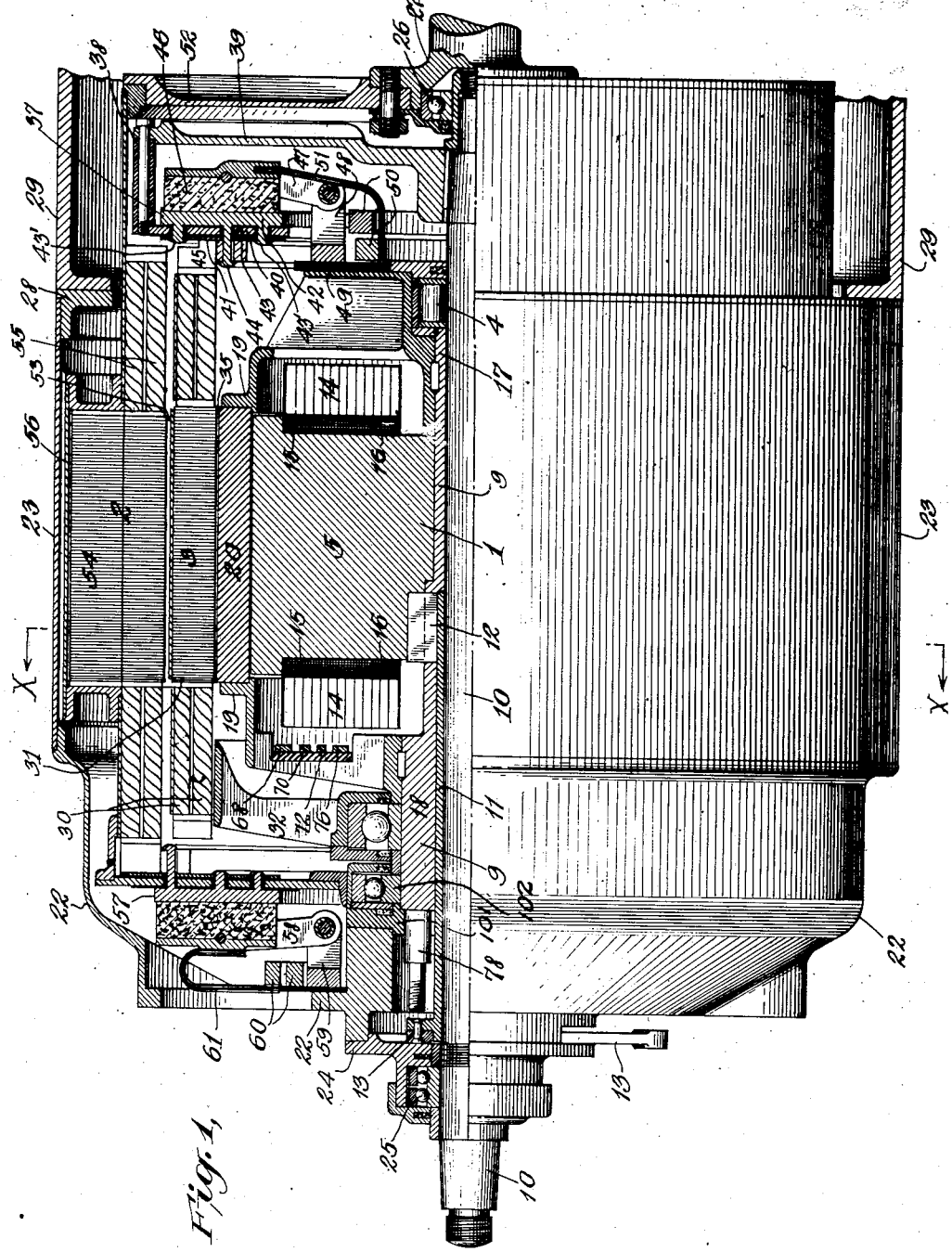
Fig. 1 is a view partly in section of the power transmission apparatus.

As shown in Figs. 1 and 2, my improved power transmission comprises the angularly adjustable field magnet structure 1, which is rotatable within certain limits, the stationary auxiliary pole pieces 20, 21 concentric with the field magnet structure, the rotatable generator armature 2, and the second winding 3 rotatable independently of the field magnet structure 1 and armature 2, this winding 3 being positioned intermediate the pole pieces and the generator armature and contiguous to and concentric with the generator armature. The armature 2 and second winding 3 are so constructed and arranged with respect to each other and the field structure, that the field flux traverses both armature windings.

The field magnet structure 1, comprises the four field magnets 5, 6, 7 and 8, constructed preferably of soft steel and oscillatably or partially rotatably mounted upon a longitudinally-extending shaft 9. The shaft 9 is bored to loosely receive the shaft or driven member 10 which is adapted to be connected to a propeller shaft or other device which it may be desired to drive.

A portion of the shaft 9 is counterbored to receive the hollow shaft or quill 11 which is rotatably located between the shaft 9 and the shaft 10. The inner end of the quill 11 carries a key 12 that projects into a corresponding slot in the yoke of the field magnet cores. The key 12 serves to rotate the field magnet structure as the quill 11 is rotated. The other end of the quill 11 is keyed or otherwise suitably secured to the end of the operating lever 13. The shaft 9 is suitably cut away, as shown in Fig. 2, so as to permit of about a 90° rotation of the field magnet structure.

Each of the field magnets comprises a core and a series exciting coil 14, and in addition each of two oppositely-disposed field magnets is provided with a shunt coil 15 and a teaser coil 16.

Keyed upon the ends 17 and 18 of the shaft 9, projecting beyond either side of the field magnet structure, are the spiders 19 carrying the stationary auxiliary pole pieces 20, 21. As shown in Fig. 1, these pole pieces are slightly longer than the pole faces of the field magnets. While the pole pieces may be of any desired circumferential width, in the preferred embodiment of my invention the circumferential width of each pole piece 20 is substantially twice the circumferential width of pole pieces 21. As shown in Fig. 2 the auxiliary pole pieces 20, 21 are arranged alternately. The auxiliary pole pieces are rigidly held in the spider 19 and with just sufficient clearance from the pole faces of the field magnet cores to permit the rotation of the latter.

The rearwardly-extending member or hub 18 of the shaft 9 is rigidly secured to the end bell housing 22 which forms one end of the transmission casing 23 by means of the members 101 and 102. The end bell 22 carries the hub 24 which is provided with bearings 25, which form a bearing in which one end of the driven member 10 is rotated, the other end of member 10 being mounted for rotation in bearings 4 carried by the brush-holder support 49 hereinafter referred to and in bearings 26 carried in the end of the crank shaft flange 27.

The casing 23 is adapted to be secured to any stationary support such as the frame of an automobile or the engine bell-housing 29, by the flange 28. It will, therefore, be noted that the casing 23, with its attached end bell 22, the members 101 and 102 as well as the shaft 9, are always maintained stationary.

The second winding 3 comprises a plurality of copper conductors 30 and interspersed insulated iron laminations 31. These iron laminations receive and transmit the magnetic flux in a radial direction to the core of the armature hereinafter described. One end of the second winding 3 rests upon the spider 32, which is rotatably mounted upon the hub 18, the other end of the conductors being secured to the commutator 37, hereinafter described. The copper conductors and iron laminations of the second winding are so arranged with respect to each other as to form a hollow cylinder which in the present instance surrounds and is concentric with the field magnet structure 1 and the auxiliary pole pieces 20 and 21 and is spaced from the latter by an air gap 35. The conductors 30 of the second winding are wound in the conventional manner to form a single winding.

The construction and configuration of the second winding is shown in Fig. 2 wherein it will be noted that the iron laminations 31 are so arranged with respect to the conductors 30 so that they form a series of teeth. While I have shown in Fig. 2 only a number of these iron laminations or teeth with the conductors 30 disposed therebetween, it is to be understood that the entire winding comprises alternate conductors and iron laminations or teeth.

The second winding 3 is secured to the driven member 10 by means of its commutator 37, which in turn is secured to the aluminum ring 38 mounted upon the spider 39, this spider being keyed or otherwise suitably secured to the driven member 10. The commutator 37 is of the disc type and comprises the perforated steel plate or disc 40, copper strips 41, and commutator bars 42. The strips 41 and the commutator bars 42 are disposed on opposite faces of the plate 40 and insulated therefrom by sheets of mica 43 and secured together by any suitable means such as by the projections 43' which are integral with the commutator bars and riveted over. The plate 40 is secured at its periphery to the ring 38, while the commutator is secured to the second winding by means of the riveted projections 44 of the commutator bars 42, passing through the clips 45 which are secured to the conductors of the second winding.

The brush 46 for the commutator 37 is pivotally mounted upon the arm 47, which in turn is pivotally secured to the arm 48, rigidly secured to but insulated from the brush-holder support 49, the latter being rigidly secured to the forwardly-extending hub 17 of the stationary shaft 9. The brush 46 is electrically connected to connection rings 50 by the leads 51. While I have shown and described only one brush, it is to be understood that the second winding is also provided with similar brushes, preferably four in number.

The armature 2, which is adapted to be driven by the prime mover through the medium of the crank shaft flange 27 and the spider 52 to which the armature is rigidly secured, is concentric with the field structure and the second winding just described and spaced from the latter by the air gap 53. This armature comprises a laminated iron core 54 and an armature winding composed of conductors 55 carried by the cylindrical casing 56 which is secured at one end to the spider 52 and rotatably mounted at its other end through the medium of its commutator 57 upon the rearwardly-extending hub 18 of the shaft 9. The laminations are so arranged with respect to the conductors 55 that they form a series of teeth. The armature is interiorly wound, the conductors 55 being placed between the teeth as shown in Fig. 2 and insulated therefrom.

The commutator 57, being similar in its construction to the commutator 37 will not be described in detail. Each of the brushes (preferably four in number) for the commutator 57 is pivotally secured to an arm 58 which is pivotally secured to the arm 59 which in turn is rigidly secured to but insulated from the end bell housing 22. The brushes of the commutator 57 are also electrically connected to connection rings 60 by the leads 61.

Commutators constructed, as herein shown and described, are not affected to any appreciable extent by the vibrations set up in the transmission by the operation of the prime mover, and hence the commutator brushes will maintain good contact at all times with minimum spring pressure.

From the description thus far given it will be seen that my transmission, so far as the mechanical structure is concerned, comprises an angularly adjustable or partially rotatable field magnet structure, auxiliary pole-pieces and two independently rotatable armature windings concentric with each other and enclosed in the casing 23, the field magnet structure being angularly adjustable or rotatable about the axis of rotation of the generator armature 2 and second winding 3, and in parallelism therewith, so that the angular adjustment or partial rotation of the field structure will not vary the air-gap between the field and the armature windings. I preferably make the spiders 19, 22, 32, 39 and 52 open so as to insure good circulation of air through the transmission at all times.

Electrical connections between the series and shunt field coils 14 and 15, the storage battery 77, and the armature windings 2 and 3, are effected by means of contacts 62, 63, 64 and 65 carried by a bracket (not shown) secured to the field magnet cores 5 and 8, which contacts sweep over the concentrically-arranged segments 66 to 76 inclusive, mounted on but insulated from one of the spiders 19, as the field magnet structure is partially rotated.

Contacts 62 and 65 are connected to the terminals of the series field coils 14, and contacts 63 and 64 are connected to the terminals of the shunt field coils 15. The segments 67, 68, 72, 73 and 75 are adapted to be electrically connected to the armature 2, the second winding 3 and battery 77 through the medium of contacts (not shown) carried by the insulated conductor 78 passing through the hub 18.

Fig. 13 illustrates the arrangement of the auxiliary pole pieces and the development of the generator and motor armature windings in relation thereto and their respective commutators. As shown therein, the path of the conductors of each winding may be easily traced, the conductors of the generator windings with its attached commutator bars and brushes being shown in solid lines, while the conductors of the motor or second winding with its attached commutator bars and brushes are shown by broken lines. Both the generator and motor windings are preferably of the single lap winding type—that is, the terminals of an element of a winding are connected to adjacent commutator segments.

In Figs. 8 to 12, inclusive, I have illustrated diagrammatically the various electrical arrangements for operating my device under various conditions. As therein shown, the generator winding and the second winding as well as the field coils and storage battery are adapted to be electrically connected together in various relations by means of the segments 66 to 76 inclusive through the medium of contacts 62 to 65 inclusive.

Segment 68 is connected to one set of brushes of armature winding 2 by conductors 83 and 84, and segment 72 is connected to the other set of brushes by conductors 85 and 86. Segment 67 is connected to one set of brushes of the second winding 3 by conductor 87, and segment 72 is connected to the other set of brushes by conductors 85, 88 and 89. Segment 73 is connected to the positive side of the battery 77 by conductors 90 and 91. Segments 69 and 71 are connected to segments 72 and 70 respectively; segments 66, 67 and 74 are connected to segments 74, 76 and 68 respectively, while segment 68 is connected to segment 70.

The teaser coil 16 is connected across the battery and its circuit is opened and closed by the switch 79, which is always closed when the device is being operated except during the starting operation and in neutral. In the circuit connecting the generator armature and the storage battery is placed a standard relay 82 adapted to close when the voltage of the generator exceeds a predetermined amount and open when the voltage is less than a predetermined amount.

To operate the device as a starting device to operate the prime mover, it is necessary that the armature 2 operate as a motor receiving current from the storage battery 77. The lever arm 13 is actuated so as to bring the contacts 62, 63, 64 and 65 into engagement with segments 66, 69, 71 and 73 respectively. This will place the series field coils 14 in series with the battery and armature winding 2 through the medium of segments 66 and 73, and the shunt field coils 15 in shunt across the generator armature circuit through the medium of segments 69 and 71. Inasmuch as the armature winding and the series field coils are in circuit with the storage battery, the magnetic field flux is a maximum thereby producing a maximum starting torque.

Tracing the circuits as shown in Fig. 9, the current will flow from the positive terminal of the battery 77 by means of conductors 90 and 91 to segment 73, thence by conductor 92 to the series field coils 14, thence by conductor 93 to segments 66, 74 and 68, then by conductors 83 and 84 to the armature 2, then by conductors 86, 88, 89 and 94 to the negative terminal of the battery. At the same time the shunt field coils 15 are placed in shunt across the armature winding circuit, one terminal of the shunt coils 15 being connected by conductor 95, segments 69 and 72 and conductor 85 to conductor 86, the other end of the shunt coils being connected by conductor 96, segments 71, 70 and 68 to the other side of the armature winding 2.

The armature 2 will now operate as a motor to start the prime mover. During this time the relay 82 and the teaser switch 79 are open.

The initial position of the field magnets with relation to the auxiliary pole pieces, and the two armature windings is diagrammatically illustrated in Fig. 3, wherein $a$, $a$ and $a'$ and $a'$ represent the inductors of armature 2 in the neutral axes of the armature, and $b$, $b$ and $b'$, $b'$ represent the inductors of the second winding 3 in the neutral axes of the second winding. For the sake of convenience I will hereinafter refer to such inductors as "neutral inductors".

In the starting position the center lines of the field magnet cores are substantially in line with the neutral inductors of the second winding, or substantially midway between the neutral inductors of the armature. In such position, the polarity of the field magnets is assured as the series field coils are in circuit with the battery. The flux will accordingly pass from the pole faces of the magnets through the auxiliary pole pieces, through the second winding into the armature core, thereby causing the armature 2 to rotate.

If the field magnet structure be rotated clock-wise so as to bring the contacts 62 and 65 upon the right-hand end of segments 66 and 73 (as indicated by the dotted lines in Fig. 9) the pole faces will be under only a part of the pole pieces 20 but under the whole of pole pieces 21. This will tend to divert the flux passing through pole pieces 20 thereby varying the effective flux supplied to both armature windings without, however, having varied the field excitation. This will cause the armature 2 to speed up, and hence rotate the prime mover at higher speed.

The teaser switch 79 which may be manually operated, for example, should always be open when contacts 62 and 65 are on segments 66 and 73, but closed when said contacts leave said segments. The contacts 62 and 65 are also so constructed that as the field magnet structure is rotated clockwise from the starting position, the contacts 62 and 65 will not engage segments 67 and 74 or 75 respectively, but will engage those segments after the field structure has been rotated to the neutral position, shown in Fig. 4.

After the engine or prime mover has reached sufficiently high speed, the field structure is rotated clockwise by the lever 13 until the contacts 62, 63, 64 and 65 engage segments 68, 70, 72 and 76 respectively. The teaser switch 79 should now be closed which will place the teaser coils 16 in series with the battery 77. The armature 2, the second winding 3 and the series field coils 14 will now be in series, while the shunt field coils 15 will be in shunt across the armature circuit. The prime mover will now operate to drive the armature winding 2 to cause the same to function as a generator.

With these connections, as shown in Fig. 10, the current flow through the field coils 14 and 15 is in a direction opposite to that in the starting position, as shown in Fig. 9. As the teaser switch 79 is closed the current will also flow through the teaser coil in the same direction as in the series and shunt field coils. During this time the voltage in the generator armature being greater than that of the opposed storage battery, the relay 82 will close and a charging circuit will flow through the storage battery, which circuit may be traced as follows: From the positive side of the generator armature 2, conductors 84 and 97, relay 82, conductor 98, through battery 77, conductors 94, 89, 88 and 86 to the negative side of the generator.

With the electrical arrangements as shown in Fig. 10, the current flow through all of the field exciting coils is in the same direction, which results in a maximum field flux, the polarity of which is assured and maintained by the teaser coil 16.

When the contacts 62, 63, 64 and 65 first engage segments 68, 70, 72 and 76 respectively (as shown by the solid lines in Fig. 10) the pole faces of the field cores will be under the whole of pole pieces 20 and under only a part of pole pieces 21. It will be noted, however, that any set of pole pieces 20 and 21 with their co-operating pole face will be between the neutral axes of the second winding, while the same set of pole pieces 20 and 21 will be on opposite sides of the neutral axes of the armature. This will produce a weak effective field for the armature and a strong effective field for the second winding.

If the field structure be still further rotated until it assumes the position shown in Fig. 2, the pole faces of the field cores will be centrally located with respect to pole pieces 20, while pole pieces 21 will be magnetically neutral. Substantially all of the flux will therefore pass through the inductors of both armature windings and all of this flux will be effective. The second winding and the driven part will accordingly rotate at substantially the same speed and with substantially the same torque as the armature and the prime mover.

As the field structure is rotated further to the right until it assumes the position shown in Fig. 5, the pole face of each field core will pass under only a part of the adjoining pole piece 21. In such position the pole pieces 21 carry part of the flux so that the flux will be carried on both sides of the neutral axes of the second winding. This will produce a condition whereby the flux passing through the armature between any two adjacent neutral inductors $a$ and $a'$ will be of the same polarity and all effective, but the flux passing through the second winding between any two adjacent inductors $b$ and $b'$ will be composed of fluxes of different polarities. This results in producing a strong effective field for the armature and a relatively weak effective field for the second winding, thereby causing the second winding (and the driven part) to rotate at a higher speed than the armature and prime mover, but with less torque.

To place the device in neutral position, the field magnet structure is rotated from the "high" position counter-clockwise so as to bring the contacts 62, 63, 64 and 65 out of engagement with the segments 68, 70, 72 and 76 as illustrated in Fig. 8, and at the same time opening the teaser switch 79. In this position all of the circuits are open.

If it is desired to operate the device as an electro-magnetic brake, the field structure is rotated counter-clockwise from the neutral position by means of the lever arm 13 so as to bring contacts 62, 63, 64 and 65 into engagement with segments 67, 69, 71 and 75 respectively. This will place the series field coils 14 in series with the second winding through a braking resistance 80 and a braking switch 81 which is automatically closed. During this counter-clockwise movement of the field structure from neutral to braking position the teaser switch 79 should be closed. At the same time the shunt field coils 15 will be placed in series with the armature 2, as illustrated in Fig. 11. With these connections the momentum or driving effect of the driven part (such as an automobile) will drive the second winding 3 as a generator. The current developed by the second winding flows from the positive brushes of the second winding by conductor 87 to segment 67, then by conductor 93 to series field coils 14, then by conductor 92 to segment 75, then by conductor 99, braking resistance 80, braking switch 81 and conductors 100 and 89 to the negative brushes of the second winding. During this time the shunt field coils 15 will only be supplied with current at a very low voltage from the generator armature because of its weak effective field, the current flowing through the armature winding 2 being in a direction reverse to that during high speed position as shown in Fig. 10. The power absorbed by the second winding acting as a generator consumes the momentum or driving effect of the driven part and will rapidly and gently bring the second winding and its attached driven part to rest.

When the device is operating as an electro-magnetic brake, the position of the field magnets with respect to the auxiliary pole pieces is illustrated in Fig. 7, wherein it will be seen that the pole face of each field core is under the whole of an auxiliary pole piece 21 and under only a part of auxiliary pole piece 20. The auxiliary pole pieces 20 and 21 co-operating with the pole face of any magnet core are located between the neutral inductors of the second winding but on either side of the neutral inductors of the armature winding 2. This will produce a strong effective field for the second winding and a relatively weak effective field for the armature winding.

In order to reverse the direction of operation of the device—that is, to rotate the second winding in a reverse direction—the field magnet structure is rotated so as to bring the contacts 62, 63, 64 and 65 into engagement with segments 67, 69, 71 and 74 respectively, thereby placing the armature winding 2, the second winding 3 and the series field coils 14 in series with each other, while the shunt field coils 15 will be in shunt across the armature circuit, as illustrated in Fig. 12. In this position, the braking switch 81 being open, current from the armature winding 2 will flow through the armature 2 and the second winding 3 in the same direction as in the "high" position, but in a reverse direction through the field coils 14 and 15. This current may be traced as follows: From the positive side of the armature 2 by conductors 84 and 83, segments 68 and 74, conductor 92 to the series coil 14, then by conductor 93, segments 67 and conductor 87 to the second winding 3, then by conductors 89, 88 and 86 to the other side of the armature winding 2. At the same time current will flow from the positive side of the armature winding 2 through conductors 84 and 83 to segment 70, thence to segment 71, then by conductor 96 to the shunt field coils 15, then by conductor 95 to segment 69, then to segment 72 and thence by conductors 85 and 86 to the other side of the armature 2.

The position of the field cores with respect to the auxiliary pole pieces is now as illustrated in Fig. 6. As shown therein the pole face of any field core is under the whole of auxiliary pole piece 21 and under only a small portion of auxiliary pole piece 20. The auxiliary pole pieces co-operating with any pole face of a magnet core are located between the neutral inductors of the second winding but on opposite sides of the neutral inductors of the armature winding. In this position the auxiliary pole piece 20 will have the same polarity as its companion pole piece 21, but the flux through pole piece 20 will tend to neutralize the flux passing through pole piece 21 located between the adjoining neutral inductors of the second winding, thus giving a strong effective field for the motor winding and a relatively weak effective field for the armature.

It will be noted that with the construction and arrangement, and the various electrical connections, herein shown and described, the relative speed of the two armatures can be changed without varying the field excitation; that the effective flux supplied to the armatures can be varied without varying the field excitation; that the flux supplied by the field magnets and traversing both armatures can be diverted without varying the amount of the flux traversing both armatures; that the number of effective active inductors in each armature winding can be varied inversely; that the voltages of the armature windings may be varied inversely; and that the ratios between the torques of the two armatures may be varied, each of said ratios being predetermined, definite and constant under all conditions of load and speed.

It will be further noted that the construction is such that when the pole-face of any magnet core bridges the neutral zone it will provide a leakage flux of such polarity that it will reverse the short-circuited current flowing in the neutral inductors of one or the other of said windings, thereby reducing sparking in a manner similar to that obtained by suitable commutating poles; also, during the normal operation of the device the rotation of the field will cause the voltages of the armature and the second winding to vary inversely—that is, rotation in one direction will increase the voltage of the armature and decrease the voltage of the second winding, and rotation of the field in the opposite direction will decrease the voltage of the armature and increase the voltage of the second winding. Moreover, with my improved power transmission, variation in the effective field flux is secured without the utilization of resistance in the field circuits, while the making or breaking of any contact carrying full load current is avoided.

In the embodiment of my invention, as herein shown and described, the armature surrounds and is concentric with the second winding and the magnetic field structure. The armature and field structure may, however, be interchanged so that the field structure may be exterior to and encircle the second winding and the armature. In such modified form the auxiliary pole faces will be likewise intermediate the magnetic field structure and the second winding, the armature being connected to and driven by the prime mover while the second winding will be connected to the driven part as in the embodiment herein shown and described.

While I have herein shown and particularly described one embodiment of my invention, it is obvious that changes in the arrangement, construction and combination of the several parts of my device can be made without departing from the spirit and scope of my invention.

What I claim is:

1. An electric power transmission apparatus comprising two contiguous armature windings rotatable independently of each other, and an angularly adjustable field structure adapted to produce a flux traversing both armatures.

2. An electric power transmission apparatus comprising an oscillatable field structure, and two concentric armature windings rotatable independently of each other and of said field structure, one of said armature windings being intermediate said other armature winding and said field structure.

3. An electric power transmission apparatus, comprising an oscillatable field structure, two contiguous concentric armature windings rotatable independently of each other and of said field structure, and means for oscillating said field structure.

4. An electric machine comprising two contiguous armature windings rotatable independently of each other, an angularly adjustable field structure adapted to produce a flux traversing both armatures, and means for diverting said flux.

5. An electric machine comprising an oscillatable field magnet structure, two independently rotatable armature windings concentric with each other and with said field magnet structure and means for diverting the flux produced by said field magnet structure.

6. An electric power transmission apparatus comprising an oscillatable field magnet structure, two armature windings independently rotatable about a common axis, and means for partially rotating said field magnet structure about said axis.

7. An electric machine comprising two contiguous concentric armature windings rotatable independently of each other, an angularly adjustable field magnet structure adapted to produce a flux traversing both armature windings, and means for diverting said flux.

8. An electric machine comprising an oscillatable flux-producing structure, two independently rotatable contiguous armature windings, each provided with a commutator and brushes therefor, and means for reversing the short-circuited current flowing in the neutral inductors of one of said windings when the field structure is oscillated.

9. An electric power transmission apparatus comprising two contiguous armature windings rotatable independently of each other, an oscillatable field magnet structure, and means for partially rotating said field magnet structure without varying the air-gap between said field structure and the armature winding adjacent thereto.

10. An electric machine comprising an angularly adjustable field magnet structure, two contiguous armature windings rotatable independently of ecah other, and a plurality of flux-diverting means cooperating with said field magnet structure and magnetically common to said armature windings.

11. An electric machine comprising an oscillatable field magnet structure, two armature windings rotatable independently of each other, and a plurality of stationary flux-diverting means co-operating with said field magnet structure and magnetically common to said armature windings.

12. An electric machine comprising an angularly adjustable field magnet structure, two concentric contiguous armature windings rotatable independently of each other, and a plurality of stationary independent pole-pieces contiguous to one of said armature windings and magnetically common to both armature windings.

13. An electric machine comprising an oscillatable set of field magnets, two independently rotatable armature windings, and a plurality of stationary pole-pieces intermediate one of said armature windings and said field magnets.

14. An electric machine comprising an oscillatable field magnet structure, a rotatable armature concentric with said magnet structure, an independently rotatable second winding intermediate said armature and said magnet structure and concentric therewith, and means for diverting the flux produced by said field magnet structure.

15. An electric machine comprising an oscillatable set of field magnets, a rotatable armature concentric with said field magnets, an independently rotatable second winding intermediate said armature and said field magnets and concentric therewith, and stationary pole pieces intermediate said second winding and said field magnets.

16. An electric machine comprising an oscillatable flux-producing structure, two independently rotatable armature windings, stationary pole-pieces intermediate said flux-producing structure and one of said windings, and means for partially rotating said flux-producing structure.

17. An electric machine comprising an oscillatable flux-producing structure, two independently rotatable armature windings, a commutator for each of said windings, stationary pole-pieces co-operating with said structure and magnetically common to said windings, and means for partially rotating said flux-producing structure.

18. An electric machine comprising two independently rotatable armature windings, an oscillatable field magnet structure adapted to produce a flux traversing both armatures, and means for diverting said flux without varying the amount of the flux traversing both armatures.

19. An electric machine comprising an oscillatable field magnet structure, two independently rotatable armature windings, stationary flux-diverting means co-operating with said magnet structure and magnetically common to said windings, and means for varying the relative speed of said armature windings without varying the field excitation.

20. An electric machine comprising an oscillatable field magnet structure, two contiguous independently rotatable armature windings, stationary pole-pieces intermediate said field magnet structure and one of said armature windings, and means for varying the relative speed of said armature windings without varying the field excitation.

21. An electric machine comprising an oscillatable flux-producing structure, two independently rotatable armature windings, stationary flux-diverting means co-operating with said flux-producing structure and magnetically common to said windings, and means for varying the effective flux supplied to both armature windings by said flux-producing structure without varying the field excitation.

22. An electric machine comprising an oscillatable flux-producing structure, two contiguous independently rotatable armature windings, stationary flux-diverting means co-operating with said flux-producing structure and magnetically common to said windings, and means for diverting the flux produced by said flux-producing structure.

23. An electric machine comprising an oscillatable flux-producing structure, two independently rotatable armature windings, stationary flux-diverting means co-operating with said flux-producing structure and magnetically common to said windings, and means for diverting the flux from said flux-producing structure to secure substantially sparkless commutation.

24. An electric machine comprising an oscillatable flux-producing structure, two independently rotatable armature windings, stationary flux-diverting means co-operating with said flux-producing structure and magnetically common to said windings, and means for partially rotating said flux-producing structure.

25. An electric machine comprising an oscillatable flux-producing structure, two contiguous independently rotatable armature windings, stationary pole-pieces intermediate said flux-producing structure and one of said armature windings, and means for imparting a limited rotative movement to said flux-producing structure.

26. An electric machine comprising a flux-producing structure, two concentric independently rotatable armature windings, stationary flux-diverting means co-operating with said flux-producing structure and magnetically common to said windings, and means for varying inversely the voltages of said armature windings.

27. An electric machine comprising a flux-producing structure, two independently rotatable armature windings, stationary flux-diverting means co-operating with said flux-producing structure and magnetically common to said windings, and means for varying inversely the number of effective active inductors in each armature winding.

28. An electric machine comprising a field magnet structure, two independently rotatable armature windings, stationary flux-diverting means co-operating with said magnet structure and magnetically common to said windings, and means for varying the ratios between the torques of said armature windings, each of said ratios being predetermined, definite and constant under all conditions of load and speed.

29. An electric machine comprising a field magnet structure adapted to produce a magnetic flux, two independently rotatable armature windings concentric with said magnet structure, pole pieces intermediate said magnet structure and one of said windings and means for varying the ratios between the torques of said armature windings, each of said ratios being predetermined, definite and constant under all conditions of load and speed.

30. In combination, an electric machine comprising a set of field magnets provided with series and shunt coils, two independently rotatable armature windings concentric with said field magnets, stationary flux-diverting means, and means for electrically connecting the two armature windings and the series field coils in series with each other and the shunt field coils in shunt with one of said armature windings.

31. In combination, an electric machine comprising an oscillatable set of field magnets provided with series and shunt coils, two independently rotatable armature windings concentric with said field magnets, stationary flux-diverting means, means for electrically connecting the two armature windings and the series field coils in series with each other and the shunt field coils in shunt with one of said armature windings, and means for partially rotating said field magnets.

32. In combination, an electric machine comprising a set of field magnets provided with series and shunt coils, two independently rotatable armature windings concentric with said magnets, stationary flux-diverting means, and means for electrically connecting the series field coils and one of said armature windings in series with a source of current supply and the shunt field coils in shunt with the last-mentioned armature winding.

33. In combination, an electric machine comprising an oscillatable set of field magnets provided with series and shunt coils, two independently rotatable armature windings concentric with said magnets, stationary flux-diverting means, means for electrically connecting the series field coils and one of said armature windings in series with a source of current supply and the shunt field coils in shunt with the last-mentioned armature winding, and means for partially rotating said field magnets.

34. The combination with an electric machine comprising a set of field magnets provided with series and shunt coils, two independently rotatable armature windings, and stationary flux-diverting means, of a resistance, and means for electrically connecting the series field coils in series with one of said armature windings through said resistance and the shunt field coils in shunt with the other armature winding.

35. The method which consists in establishing a magnetic flux, rotating a group of inductors in said flux to generate current, transmitting this current to another group of inductors independently rotatable in said flux, and angularly displacing said magnetic flux to vary the ratio of effective active inductors in each group of inductors.

36. The method which consists in establishing a magnetic flux, rotating a group of inductors in said flux to generate current, transmitting this current to another group of inductors independently rotatable in said flux, and varying equally the reluctance of the magnetic circuit through both groups of inductors.

37. The method which consists in establishing a magnetic flux, rotating a group of inductors in said flux to generate current, transmitting this current to another group of inductors independently rotatable in said flux, and simultaneously varying inversely the number of effective active inductors in each of said groups of inductors.

38. The method which consists in establishing a magnetic flux, rotating a group of inductors in said flux to generate current, transmitting this current to another group of inductors independently rotatable in said flux, and angularly displacing said magnetic flux to vary the effective flux cut by both groups of inductors without varying the field excitation.

39. The method which consists in establishing a magnetic flux, rotating a group of inductors in said flux to generate current, transmitting this current to another group of inductors independently rotatable in said flux, and angularly displacing said magnetic flux traversing both groups of inductors to vary the relative speed of said groups of inductors.

40. The method of transmitting power from a prime mover to a driven part, which consists in exciting a magnetic field structure to establish a magnetic flux, rotating by said prime mover a group of inductors in said flux to generate current, transmitting this current to another group of inductors independently rotatable in said flux and connected to said driven part, and partially rotating said field structure to establish specific predetermined definite controlled ratios between the torques of said groups of inductors under all conditions of load and speed.

41. The method which consists in exciting a magnetic field structure to establish a magnetic flux, cutting said flux by two independently rotatable groups of inductors, and partially rotating said field structure to vary the effective flux supplied to and cut by both of said groups of inductors without varying the field excitation.

42. The method which consists in exciting a magnetic field structure to establish a magnetic flux, rotating in said flux a group of inductors to generate current, transmitting this current to another group of inductors independently rotatable in said flux, and angularly displacing said flux to vary inversely the effective voltages of said groups of inductors.

This specification signed and witnessed this 28th day of October, 1920.

ETHELBERT M. FRASER.

Signed in the presence of—
W. C. MARGESON,
G. McGRANN.